United States Patent [19]

Kofman et al.

[11] Patent Number: 5,033,281
[45] Date of Patent: Jul. 23, 1991

[54] VEHICLE LOCKING DEVICE

[76] Inventors: Anatoly Kofman, 8 Tamar Street, Neve Monoson; Avraham Kavitsky, 78 Jabotinsky Street, Ramat Gan, both of Israel

[21] Appl. No.: 652,739

[22] Filed: Feb. 8, 1991

Related U.S. Application Data

[62] Division of Ser. No. 479,896, Feb. 14, 1990, Pat. No. 5,003,798.

[30] Foreign Application Priority Data

Feb. 17, 1989 [IL] Israel .................................. 89318

[51] Int. Cl.5 ............................................. E05B 65/12
[52] U.S. Cl. ........................................ 70/238; 70/209; 70/237

[56] References Cited

U.S. PATENT DOCUMENTS 3,777,518 12/1973 Meyers .................................. 70/200
4,708,005 11/1987 Bernacchi ............................. 70/238
4,747,279 5/1988 Solow .................................... 70/238
4,825,671 5/1989 Wu ........................................ 70/238
4,936,120 6/1990 Fiks ...................................... 70/202
4,972,693 11/1990 Inouve .................................. 70/238
4,974,433 12/1990 Wang ................................... 70/238
4,995,250 2/1991 Chiou ................................... 70/202

Primary Examiner—Robert L. Wolfe
Attorney, Agent, or Firm—Benjamin J. Barish

[57] ABSTRACT

A vehicle locking device includes a sleeve for removably enclosing one control member of the vehicle, and a pair of locking members movable to a closed position where they may be locked together around a second control member of the vehicle, or to an open position to permit their removal from the second control member. In one embodiment, the transmission control lever of the vehicle is thus locked to the floor-mounted handbrake lever; and in a second described embodiment, the steering wheel is thus locked to a transmission control member mounted on the steering column.

6 Claims, 1 Drawing Sheet

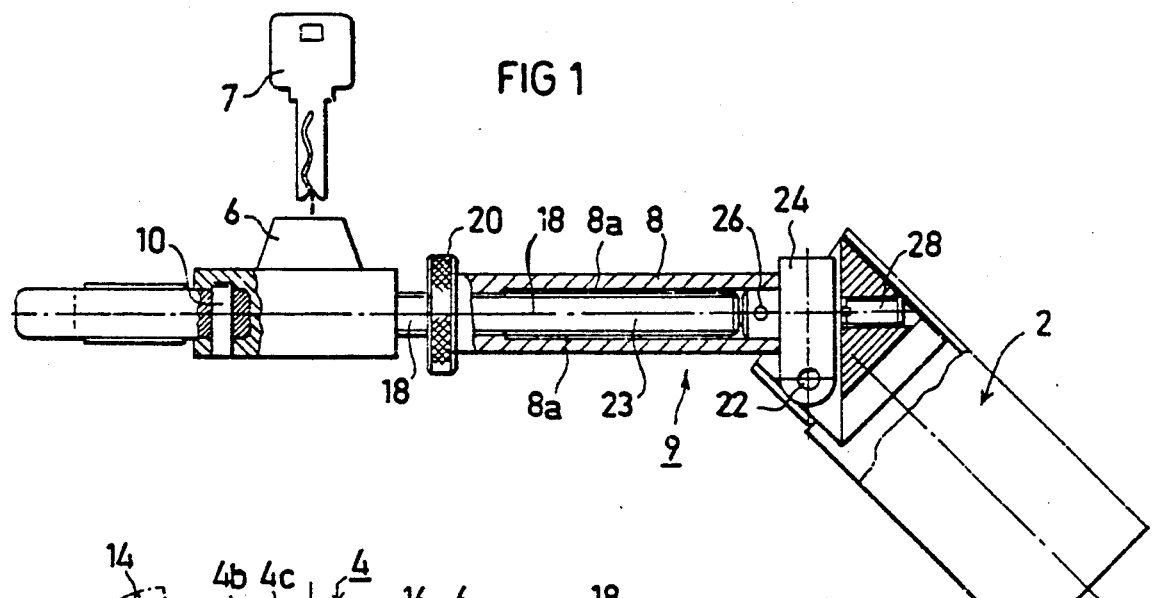
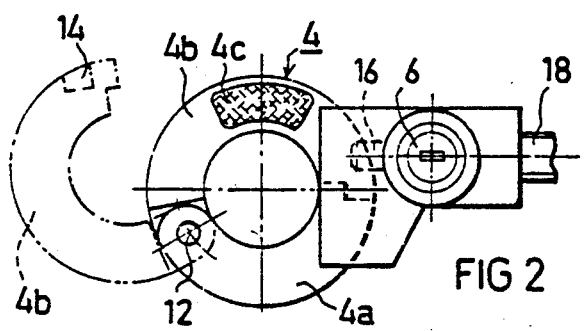
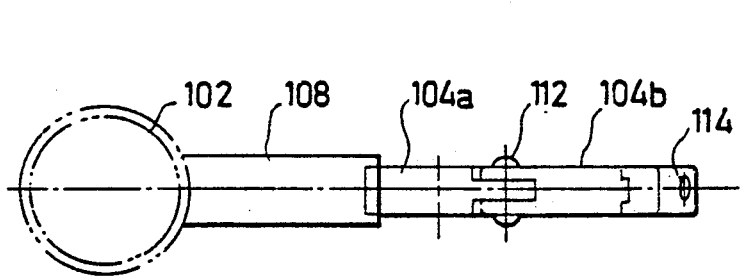
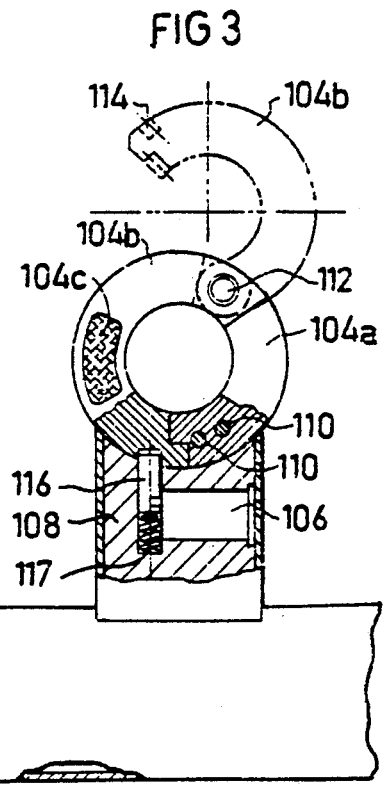

VEHICLE LOCKING DEVICE

This is a division of application Ser. No. 07/479,896 filed Feb. 14, 1990 now U.S. Pat. No. 5,003,798.

BACKGROUND OF THE INVENTION

The present invention relates to vehicle locking devices, and particularly to such devices for locking motor vehicles against unauthorized use except by a person having a proper key.

A large number of vehicle locking devices have been constructed and are now available on the market. However, efforts are continuously being made to simplify the structure of such locking devices in order to decrease their cost, to simplify the manner of application and removal of the locking devices, and to increase their adaptability for use with different types of vehicles.

OBJECTS AND SUMMARY OF THE INVENTION

An object of the present invention is to provide a vehicle locking device having advantages in the above respects.

According to the present invention, there is provided a vehicle locking device, comprising: a sleeve for removably enclosing one control member of the vehicle; a pair of locking members relatively movable with respect to each other to a closed position around a second control member of the vehicle, or to an open position to permit removal thereof from said second control member; a lock for locking said locking members in their closed positions; and a connecting assembly between said sleeve and pair of locking members preventing the sleeve from being removed from the first control member, and the locking members from being removed from the second control member, when the locking members are locked in their closed positions around said second control member.

Two embodiments of the invention are described below for purposes of example, in which the pair of locking members consist of a first jaw carried by the connecting member, and a second jaw pivotal to the first jaw.

In one described embodiment, the sleeve is dimensioned to enclose a floor-mounted handbrake lever and the locking members are configured to enclose a floor-mounted transmission control lever. In this embodiment, the connecting member connects the sleeve at an obtuse angle to the pair of locking members, and the pair of locking members are both angularly and linearly adjustable with respect to the sleeve to permit fitting the device on different vehicles.

In the second described embodiment, the sleeve is dimensioned to enclose a transmission control member mounted on the steering column, and the locking members are configured to enclose a portion of the steering wheel of the vehicle mounted at the end of the steering column. Preferably, the connecting member mounts the pair of locking members at a right angle to the sleeve, but in this case the pair of locking members may also be adjustably mounted to the connecting member, both angularly and linearly, to adapt the locking device for different types of vehicles.

It will thus be seen that a vehicle locking device constructed in accordance with the invention may be used for disabling two control members of the vehicle and not merely one. Thus, the first embodiment of the invention is particularly useful in vehicles having a handbrake and a transmission control lever both mounted on the floor, in which case the locking device disables both the handbrake and the transmission control lever. The second described embodiment is particularly useful in vehicles having a transmission control lever mounted on the steering column, whereupon the locking device disables both the transmission control lever and the steering wheel. It will also be seen that the locking device may be conveniently and quickly applied and removed by the use of a proper key, and that it is of relatively simple structure which may be manufactured in volume and at low cost.

Further features and advantages of the invention will be apparent from the description below.

BRIEF DESCRIPTION OF THE DRAWINGS

The invention is herein described, by way of example only, with reference to the accompanying drawings, wherein:

FIGS. 1 and 2 illustrate one form of locking device constructed in accordance with the invention particularly for use in vehicles having a floor-mounted handbrake lever and also a floor-mounted transmission control lever, FIG. 1 being a side elevational view, partly in section, illustrating the construction of the locking device, and FIG. 2 being an end elevational view of the locking device; and FIGS. 3 and 4 illustrate a second form of vehicle locking device, particularly useful for vehicles having a transmission control lever mounted on the steering column, FIG. 3 being a side elevational view, partly in section, of the locking device, and FIG. 4 being an end elevational view of the locking device.

DESCRIPTION OF PREFERRED EMBODIMENTS

The Embodiment of FIGS. 1 and 2

The vehicle locking device illustrated in FIGS. 1 and 2 is, as mentioned above, particularly useful for vehicles of the type having a floor-mounted handbrake lever, and also a floor-mounted transmission control lever. The illustrated locking device comprises a sleeve, generally designated 2, for removably enclosing the floor-mounted handbrake lever; and a pair of locking members, generally designated 4, relatively movable with respect to each other to a closed position (shown in full lines in FIG. 2) around the floor-mounted transmission control lever, or to an open position (shown in broken lines in FIG. 2) to permit removal from the transmission control lever. The two locking members 4 are locked in their closed position by a lock 6 operated by a key 7, both of known construction. Sleeve 2 is connected to the lock 6 and the pair of locking members 4 by a connecting member 8.

The pair of locking members 4 consist of two semi-circular curved jaws 4a, 4b. Jaw 4a is pivotally mounted to the lock 6 by means of a pin 10, and jaw 4b is pivotally mounted to jaw 4a by means of a second pin 12 so as to be pivotal to the open position shown in broken lines in FIG. 2, or to the closed position shown in full lines in FIG. 2. Jaw 4b is formed with a recess 14 engageable by a locking pin 16 projectable from lock 6 in order to lock the latter jaw in its closed position. Locking pin 16 is retractable out of recess 14 upon the insertion and rotation of the proper key 7, which thereby permits the jaw to be pivoted to its open position. Movable jaw 4b may be provided with a plastic finger piece 4c bonded to its opposite faces to facilitate gripping and moving it.

Connecting member 8 is made of a hard metal of cylindrical configuration and is formed with internal threads 8a for receiving an externally threaded rod 18 fixed to the lock 6. Rod 18 may be adjusted with respect to connecting member 8 and locked in any preselected position by locking nut 20. In this manner, the locking jaws 4a, 4b may be manually adjusted with respect to sleeve 2 in order to fit the locking device to vehicles having different spaces between the floor-mounted transmission control lever enclosed by the locking jaws, and the floor-mounted handbrake lever enclosed by sleeve 2.

Sleeve 2 is pivotally mounted to connecting member 8 by means of a pin 22 passing through a block 24 fixed to the end of connecting member 8 by another pin 26. Sleeve 2 normally assumes an obtuse angle with respect to connecting member 8 and the locking jaws 4a, 4b, which angle may be adjusted by a threaded pin 28 to fit different vehicles.

The manner of using the locking device illustrated in FIGS. 1 and 2 will be apparent from the above description.

Thus, before applying the device to any particular vehicle, the angle between sleeve 2 and locking jaws 4a, 4b is prefixed for the particular vehicle by adjustment of the threaded pin 28. Similarly the distance between the locking jaws 4a, 4b from the sleeve 2 is prefixed for the respective vehicle by threading rod 18 more or less into connecting member 8, and then locking it in position by nut 20. Once the locking device has been adjusted for a particular vehicle, it is only necessary to open the locking jaws 4a, 4b by the use of the key 7, apply sleeve 2 over the handbrake lever, and then close locking jaws 4a, 4b around the transmission control lever. Clamping jaw 4b is thus locked in its closed position by locking pin 16 of lock 6 received within recess 14 of the pivotal clamping jaw 4b.

When the clamping device has thus been applied to the handbrake lever and the transmission control lever, it will be seen that both of these levers are locked in position, thereby preventing operation of the vehicle.

In order to permit operation of the vehicle, key 7 is inserted into lock 6, and rotated so as to retract locking pin 16 from recess 14, whereupon locking jaw 4b may be pivoted to its open position. The user may then easily remove the locking device from both the handbrake lever and the transmission control lever.

The Embodiment of FIGS. 3 and 4

The locking device illustrated in FIGS. 3 and 4 is designed for use in vehicles having the transmission control lever mounted on the steering column, whereupon the transmission control lever and the steering wheel are both locked to prevent operation of the vehicle.

The locking device illustrated in FIGS. 3 and 4 comprises a sleeve 102 for removably enclosing the transmission control lever, a pair of locking members 104 and 104b relatively movable with respect to each other and lockable in a closed position enclosing the steering wheel, and a locking device 106 carried by connecting member 108 connecting sleeve 102 to the locking members. One of the locking members 104a is fixed to connecting member 108 by a pair of pins 110, and the other locking member 104b having plastic finger pieces 104c on its opposite faces, is pivotal to locking member 104a by a pin 112. The free end of the movable locking member 104b is formed with a recess 114 receiving a locking pin 116 carried by lock 106 and urged by a spring 117 into recess 114 of the movable locking member 104b to lock it in its closed position with respect to locking member 104a around the steering wheel. Locking pin 116 is withdrawable from recess 114 by the use of a proper key inserted and rotated in the keyhole of lock 106, to permit locking member 104b to be pivoted to its open position.

It will thus be seen that the locking device illustrated in FIGS. 3 and 4 is applied by first unlocking locking member 104b, pivoting it to its open position about pin 112, applying sleeve 102 around the transmission control lever mounted on the steering column, and then pivoting locking member 104b to its closed position so as to enclose a part of the steering wheel. Both the transmission control lever and the steering wheel are thus locked, thereby preventing operation of the vehicle.

While the locking device illustrated in FIGS. 3 and 4 does not include means for adjusting its various parts in order to fit different vehicles, it will be appreciated that such adjustment means as illustrated in the locking device of FIGS. 1 and 2 may also be included in the locking device of FIGS. 3 and 4.

Many other variations, modifications and applications of the invention will be apparent.

What is claimed is:

1. A vehicle locking device, comprising:
   a sleeve for removably enclosing a transmission control member mounted on the steering column of the vehicle;
   a pair of locking members relatively movable with respect to each other to a closed position around a portion of the steering wheel of the vehicle mounted at the end of the steering column, or to an open position to permit removal thereof from said position of the steering wheel;
   a lock for locking said locking members in their closed positions;
   and a connecting member between said sleeve and pair of locking members preventing the sleeve from being removed from the transmission control member, and the locking members from being removed from the steering wheel, when the locking members are locked in their closed positions around said steering wheel.

2. The vehicle locking device according to claim 1, wherein said pair of locking members consist of a first jaw carried by said connecting member, and a second jaw pivotal to said first jaw.

3. The vehicle locking device according to claim 1, wherein said connecting member mounts said pair of locking members at substantially a right angle to said sleeve.

4. The vehicle locking device according to claim 3, wherein said pair of locking members consist of a first jaw carried by said connecting member, and a second jaw pivotal to said first jaw.

5. The vehicle locking device according to claim 4, wherein said pivotal jaw is formed with a recess at its free end for receiving a locking pin carried by said connecting member.

6. The vehicle locking device according to claim 4, wherein said pivotal jaw includes plastic fingerpieces on its opposite faces.

* * * * *